United States Patent [19]

Jackovitz et al.

[11] 4,443,526

[45] Apr. 17, 1984

[54] NICO₃ ELECTRODE MATERIAL AND ELECTRODE

[75] Inventors: John F. Jackovitz, Monroeville; Joseph Seidel; Earl A. Pantier, both of Penn Hills, all of Pa.

[73] Assignee: Westinghouse Electric Corp., Pittsburgh, Pa.

[21] Appl. No.: 354,489

[22] Filed: Mar. 3, 1982

[51] Int. Cl.³ .............................................. H01M 4/32
[52] U.S. Cl. ................................... 429/223; 429/221; 252/182.1; 427/126.6
[58] Field of Search ................. 429/223, 221; 252/182, 252/1, 518; 427/126.3, 126.6, 115, 343, 435

[56] References Cited

U.S. PATENT DOCUMENTS

| | | | |
|---|---|---|---|
| 3,928,068 | 12/1975 | Jackovitz et al. | 252/182.1 |
| 3,951,686 | 4/1976 | Ness et al. | 429/223 X |
| 4,016,091 | 4/1977 | Jackovitz et al. | 429/223 X |
| 4,029,132 | 6/1977 | Jackovitz et al. | 429/223 X |
| 4,049,027 | 9/1977 | Seiger | 429/223 X |
| 4,330,603 | 5/1982 | Jackovitz et al. | 429/223 X |

Primary Examiner—Charles F. LeFevour
Attorney, Agent, or Firm—D. P. Cillo

[57] ABSTRACT

A battery plate is made by loading a supporting porous metallic plaque with an electrode paste comprising: (1) $NiCO_3$, (2) cobalt additive, (3) sufficient water to form a paste, and optionally (4) a deflocculant.

8 Claims, 2 Drawing Figures

$NiCO_3$ ELECTRODE MATERIAL AND ELECTRODE

BACKGROUND OF THE INVENTION

In present iron-nickel batteries, the nickel electrode can contain an electrode paste prepared from an aqueous slurry of: (1) $NiCO_3.2Ni(OH)_2.4H_2O$ or $2NiCO_3.3Ni(OH)_2.4H_2O$, i.e., hydrated mixtures of nickelous carbonate.nickelous hydroxide, and (2) $CoCO_3$ and/or $Co(OH)_2$. This slurry must be oxidized with hypochlorite ion, hypobromite ion, or the like, prior to drying and application to the plaque, as taught by Jackovitz et al., in U.S. Pat. No. 3,928,068. Such plaques require from 5 to 15 charge-discharge "formation" cycles to achieve maximum electrochemical output.

While the output of this paste approaches about 0.24 amp-hr/gram, close to the theoretical output of about 0.26 amp-hr/gram, it would be highly advantageous if outputs even closer to theoretical could be realized. In addition, the required oxidation of the hydrated, hydroxy containing nickel material adds to the cost of the final electrode plate. Finally, the hydrated, hydroxy containing nickel material is itself now expensive and difficult to obtain commercially, and is subject to significant expansion after hundreds of cycles. There has been a long felt need than, for a less expensive nickel electrode paste of higher output, requiring less "formation" pre-conditioning, which would also show little expansion during its useful lifetime.

SUMMARY OF THE INVENTION

The above need was filled by utilizing an aqueous paste comprising: (1) anhydrous nickel carbonate ($NiCO_3$), and (2) a cobalt compound preferably selected from $CoCO_3$, $Co(OH)_2$, hydrates thereof, and mixtures thereof. The preferred content of cobalt additive is from about 1 wt.% to about 7 wt.%, based on $NiCO_3$ weight. The $NiCO_3$ is blended with water, the cobalt additive, and preferably, a deflocculant, to provide a spreadable paste. Optionally, nickel hydroxide can also be added, in an amount up to about 50 wt.% based on $NiCO_3$ weight. The paste is rolled or otherwise applied into a porous support, preferably of a fiber metal construction, and then sized to a desired thickness, using a press, or the like, to provide a nickel electrode.

The nickel electrode of this invention requires only one charge-discharge "formation" cycle to achieve maximum electrochemical output. The paste of this invention shows outstanding dimensional stability, loaded electrodes showing little significant thickness increase after hundreds of continuous cycles. Output after 30 cycles approaches 0.26 amp-hr/gram, and the $NiCO_3$ is both relatively inexpensive and readily obtainable commercially. Unexpectedly, it was found that the $NiCO_3$ is oxidized sufficiently for electrode operation during the initial charging step, producing $NiO_2.H_2O$ and $CO_2$, with a large portion of the $CO_2$ being absorbed by the alkali hydroxide electrolyte.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

One embodiment of a battery, utilizing the active material and electrode plate of this invention, would generally comprise a plurality of alternate positive nickel plates and negative plates such as, for example, loaded iron active material plates. This stack-up would contain plate separators between the positive and negative plates, all contacted by alkaline electrolyte, such as KOH alone or with a minor amount of LiOH additive, and housed in a case having a cover, a vent, and positive and negative terminals.

Figure 1:
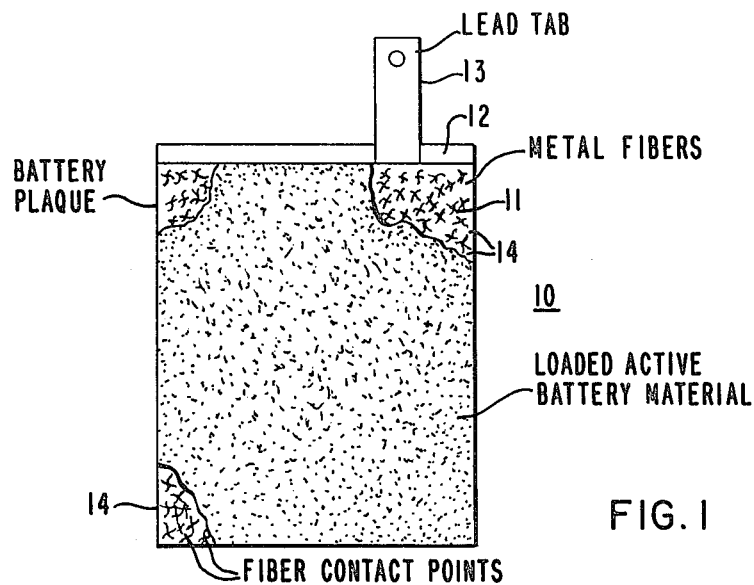
FIG. 1 shows a preferred electrode plate loaded with the material of this invention.

Preferred loaded electrode plates, shown in FIG. 1, are made from metal fibers, preferably nickel, or metal protective coated fibers, such as nickel coated steel or iron. A very suitable material is nickel coated steel wool. The plaque 10, is a flexible, expansible, compacted sheet of relatively smooth, generally contacting, intermingled, metal fibers as shown at 11 in the body of the plaque. The plaque has, in the embodiment shown, top edge 12 coined to a high density.

The coined area provides a base to which lead tab 13, which is attached to the battery terminals, is spot welded. The plaque is generally between about 85% and 95% porous. This range is preferable in providing improved conductivity and electrolyte permeability, while maintaining enough body for good plaque loading. Active nickel electrode material is loaded into the interstices of the body of this fibrous plaque to provide an electrode plate. This invention, however, is not restricted to the preferred plaque structure described herein, and the active material can be used with other supporting, porous metallic plaque structures.

The metal fibers are preferably diffusion bonded in a protective atmosphere at temperatures up to the sintering point of the fibers used. In diffusion bonding, the fibers must not be melted, or protuberances will be formed reducing active material loading (volume) within the plaque. There should only be a metallurgical bond and interdiffusion of atoms across the fiber interface at fiber contact points 14 along the fiber lengths. Diffusion bonding provides a flexible, expansible electrode structure having a large pore volume into which active material can be pasted or otherwise impregnated. Diffusion bonding also lowers the electrode plate resistance appreciably and thus the internal cell resistance in a finished cell.

The electrode paste composition of this invention is prepared by admixing: (1) anhydrous nickel carbonate, (2) a minor amount of a cobalt compound preferably selected from the group consisting of $CoCO_3$, $Co(OH)_2$, hydrates thereof, and mixtures thereof, (3) at least sufficient water to form a fluid paste, (4) 0 to about 50 wt.%, based on nickel carbonate weight, of nickel hydroxide ($Ni(OH)_2$), and preferably (5) an amount of a deflocculant effective to modify the zeta potential of the admixture, i.e., distribute the residual charge of the solid particles, so that a high solids, aqueous, fluid paste is provided, using a minimal amount of water. Useful deflocculants include, for example, anionic surfactant material, such as sodium salts of carboxylated polyelectrolytes, or alkali salts of naphthalene sulfonic acid derivatives, and the like, as are well known in the art.

The cobalt additive content ranges from about 1 wt.% to about 7 wt.% based on NiCO3 weight. The cobalt material is useful to get maximum electrochemical output from the plate. No oxidant is required for the active material composition, its use being specifically excluded, and prior chemical oxidation is not required. The term "anhydrous" is used herein to mean a compound that does not contain water combined as water of crystallization, and specifically excludes hydroxyl (—OH) groups.

The electrode paste is applied to the interstices of a porous plaque, to form a positive electrode plate. Application can be accomplished by rolling or pressing the paste into the plaque. The plaque is dried and pressed, or pressed while moist, to compact the active material. The plate is then coupled with a negative plate and charge-discharge cycled once in electrolyte comprising aqueous KOH. The charge current density must be effective to form hydrated $NiO_2$ and evolve $CO_2$. Charging is initially at a current density of about 10 to about 50 mA./sq.inch for about 48 hours, followed by a booster charge of about 140 to about 180 mA./sq.inch for about 4 hours. Charging initially at over about 50 mA./sq.inch could evolve $CO_2$ to such an extent that the electrode structure could be damaged.

The charging reaction proceeds as follows:

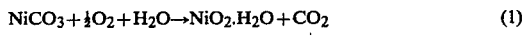

$$NiCO_3 + \tfrac{1}{2}O_2 + H_2O \rightarrow NiO_2 \cdot H_2O + CO_2 \quad (1)$$

$$2KOH + CO_2 \rightarrow K_2CO_3 + H_2O \quad (2)$$

If the concentration of $K_2CO_3$ becomes too high, an electrolyte change may be considered. The charged active material has a density of about 2.4 grams/cu.cm. After dozens of cycles, the active material achieves a true density of about 2.4 to 2.6 grams/cu.cm. depending on the strength and type of electrolyte, and this range is comparable to the initial $NiCO_3$ density. Thus, no substantial increase in active material volume occurs over the electrode cycle life and thus minimal electrode swelling occurs. This may be compared to electrodes prepared solely from $Ni(OH)_2$ and $Co(OH)_2$, which undergo significant density decrease (and volume increase) during cycling, and which can expand as much as 30% after hundreds of cycles. This expansion is always followed by a performance decline. The inclusion of up to about 50 wt.% of $Ni(OH)_2$ in the $NiCO_3$ based composition causes a maximum six percent swelling on continued cycling, principally in the interior of the electrode, and is somewhat compensated for by the nonexpansion of the carbonate portion. Over about 50 wt.%, swelling will advance beyond ten percent on continued cycling, and will not be controlled by the carbonate portion.

EXAMPLE 1

A paste was prepared by admixing in a ball mill: 95 grams of anhydrous nickel carbonate (sold commercially by Sheperd Chemical Co.), 5 grams of $CoCO_3$, 85 grams of water and 9 grams of a 25% solids aqueous solution of a sodium salt of a carboxylated polyelectrolyte deflocculant (sold commercially by R. T Vanderbilt Co. under the trade name Darvan 7). The paste was rolled into a 90% porous, 1 sq.in. nickel-plated fiber metal plaque and dried. Dry loading was 2.0 grams/sq.in., and the initial thickness was 0.096 inch.

The $NiCO_3$ pasted, positive electrode was set opposite an iron electrode in electrolyte comprising 25% KOH solution, to form an electrochemical cell. Charging of the positive electrode was initially at 20 mA./sq.in. for 48 hours, followed by a booster charge of 160 mA./sq.in. for 4 hours. Discharge was at the rate of 160 mA./sq.in. The performance was measured and is shown as electrode (A) curve in FIG. 2 of the drawings. After 50 cycles the positive electrode had a thickness of 0.097 inch, showing an insignificant increase over its initial thickness.

In a similar manner, a paste was prepared by admixing: 95 grams of anhydrous nickel carbonate, 4 grams of $Co(OH)_2$, 85 grams of water and 9 grams of Darvan 7.

The paste was rolled into a grid similar to that described heretofore and dried. Dry loading was 1.9 grams/sq.in., and the initial thickness was 0.096 inch. The $NiCO_3$ pasted electrode was cycled as described heretofore, and the performance measured and shown as electrode (B) curve in FIG. 2. After 50 cycles the electrode had a thickness of 0.097 inch, showing an insignificant increase over its initial thickness.

EXAMPLE 2

A paste was prepared by admixing in a ball mill: 100 grams of anhydrous nickel carbonate, 85 grams of water and 9 grams of Darvan 7. No cobalt additive was used. The paste was incorporated into a fiber metal grid and tested electrochemically as in Example 1. Performance is shown as electrode (C) curve in FIG. 2.

Figure 2:
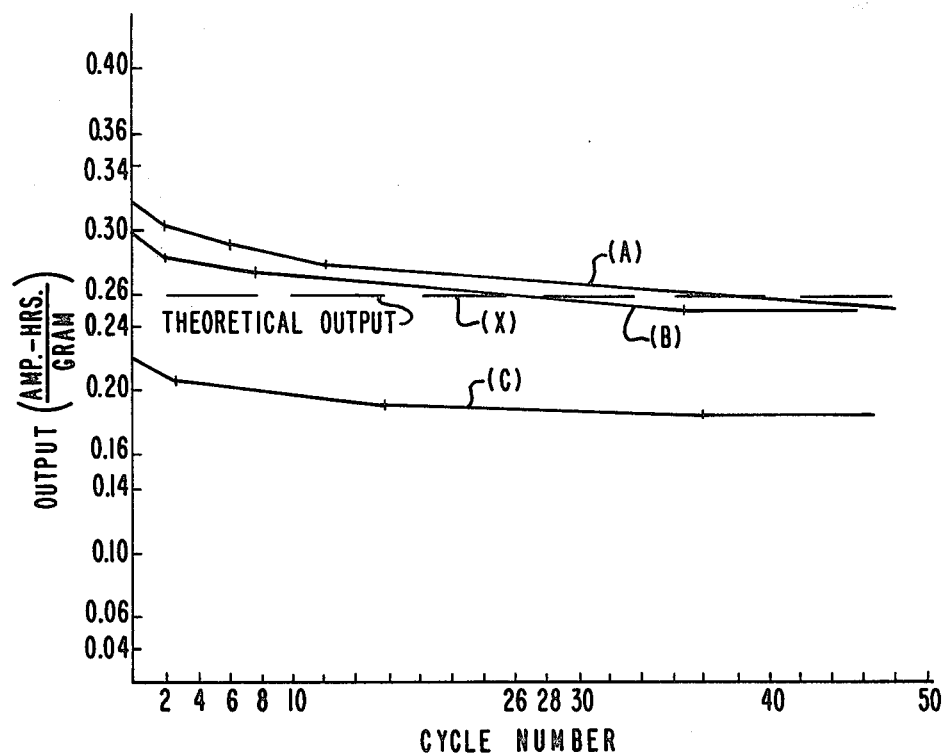
FIG. 2 is a graph showing the performance of electrode plates prepared in the Examples, in terms of output capacity vs. cycle number, in relation to the theoretical capacity value.

As can be seen from FIG. 2, the cobalt containing electrode paste of this invention provides pasted electrodes which retain theoretical output of about 0.26 ampere-hours/gram for between 25 to 38 cycles, curves (A) and (B). Without cobalt additive, output drops to below 0.20 ampere-hours/gram of $NiCO_3$. Thus, a cobalt compound is an important additive to the paste. Theoretical output is shown as line (X).

We claim:

1. An electrode paste consisting essentially of the admixture of:
   (A) anhydrous nickel carbonate,
   (B) up to about 50 wt.% of nickel hydroxide, based on anhydrous nickel carbonate weight,
   (C) a cobalt additive compound, and
   (D) sufficient water to form a paste.

2. The electrode paste of claim 1, where the cobalt compound is added in an amount of from about 1 wt.% to about 7 wt.%, based on anhydrous nickel carbonate weight, and is selected from the group consisting of $CoCO_3$, $Co(OH)_2$, hydrates thereof, and mixtures thereof.

3. The electrode paste of claim 1, also containing an effective amount of deflocculant.

4. The electrode material of claim 3, where the deflocculant is a polyelectrolyte material and is present in the range of about 1 wt.% to about 15 wt.% based on anhydrous nickel carbonate weight.

5. An electrode comprising a porous supporting metallic plaque containing an electrode material consisting essentially of the admixture of:
   (A) anhydrous nickel carbonate,
   (B) up to about 50 wt.% of nickel hydroxide, based on anhydrous nickel carbonate weight, and
   (C) a cobalt additive compound.

6. The electrode of claim 5 as positive plates in a battery comprising a plurality of alternating positive nickel plates and negative plates.

7. The electrode of claim 6, where the negative plates are iron active material plates.

8. The electrode of claim 5, where the cobalt compound is added in an amount of from about 1 wt.% to about 7 wt.%, based on anhydrous nickel carbonate weight, and is selected from the group consisting of $CoCO_3$, $Co(OH)_2$, hydrates thereof, and mixtures thereof, and the admixture also contains an effective amount of deflocculant.

* * * * *